Dec. 22, 1953 — R. H. CURTIS — 2,663,430
FILTER
Filed March 17, 1949
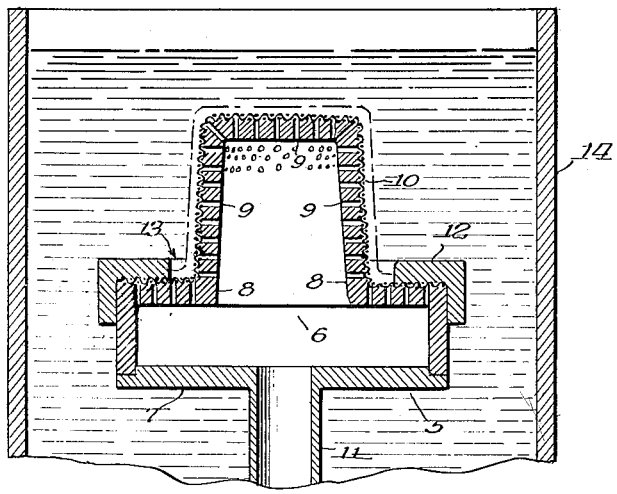
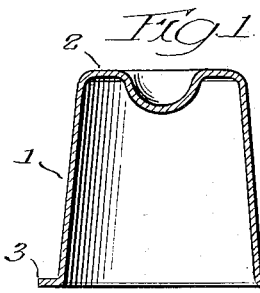
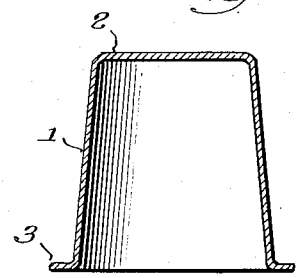
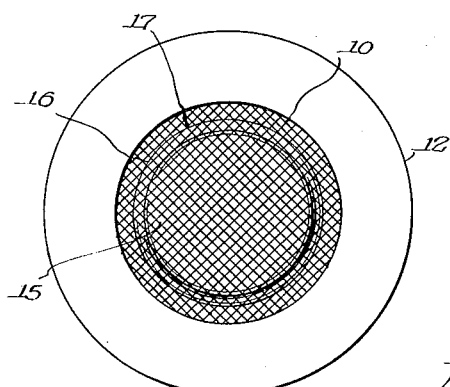
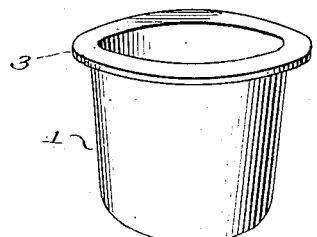
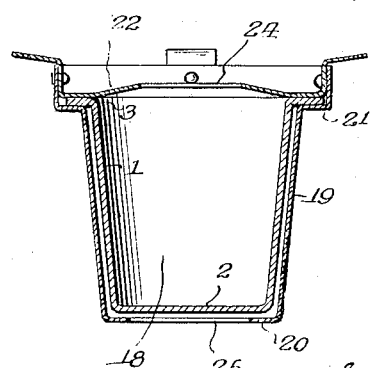
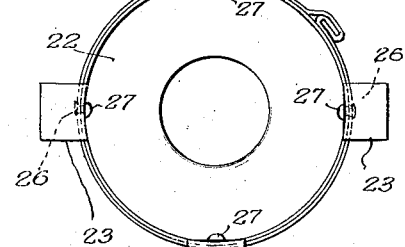
Inventor
Russell H. Curtis.
By: Spencer, Marzall, Johnston & Cook
Attys Patented Dec. 22, 1953

2,663,430

UNITED STATES PATENT OFFICE 2,663,430

FILTER

Russell H. Curtis, St. Charles, Ill., assignor to Hawley Products Company, St. Charles, Ill., a corporation of Delaware Application March 17, 1949, Serial No. 81,978

1 Claim. (Cl. 210—169)

This invention relates in general to a replaceable filter unit, and, more particularly, to a filter element for liquid fuel systems for the removal of solid particles from circulating fuel or other relatively non-viscous liquids.

Filters for liquid fuel systems have been in use for some time, but their use has been restricted because of the inefficiency of known filters and because of the cost of providing highly efficient filters. One type filter unit in general use at present for removing solids from circulating fuel systems is a copper screen which is an inefficient device. Another more expensive type of filter unit employs a casing having openings at either end, which casing is filled with a packing of hair, wool fibers or textile waste or a combination of the three. A pair of screens is secured to the ends of the casing in order to retain the packing in position in the casing. The packing is also glued to the sides of the casing. This filter unit is subject to channeling which is a characteristic of packing materials. Other types of filters are made from ceramics and porous bronze. In general, the filters in common use do not remove very fine particles having a diameter as low as 1 to 2 microns.

One object of the present invention is to provide an inexpensive filter for the efficient removal of very fine solids from liquids.

Another object of the present invention is to provide a replaceable unit for filtering gasoline or other non-viscous fuels in a circulating fuel system.

Still another object is to provide a filter element made of integral molded fibrous material.

A further object is to provide an element for a filter unit which is not subject to fluid channeling.

A still further object is to provide a filter unit having a small number of parts which may be easily and cheaply assembled.

Another object is to provide for positive entrapment of solids within a one-piece filter element of integral molded fibrous material.

These and other objects of the invention will be more easily understood by referring to the drawings in which:

Fig. 1 is a cross-sectional view of one embodiment of the integral molded fibrous filter element;

Fig. 2 is a cross-sectional view of an alternative embodiment of the integral molded fibrous filter element;

Fig. 3 is a perspective view looking into the open end of the article shown in Fig. 2;

Fig. 4 is a cross-sectional view of a preferred embodiment of the molding apparatus employed in making the molded fibrous article of Figs. 2 and 3;

Fig. 5 is a top plan view of the molding apparatus of Fig. 4 showing the screen positions and the flange determining blank;

Fig. 6 is a cross-sectional view of a complete filter unit with the molded fibrous filter element in place; and Fig. 7 is a top plan view of the complete element of Fig. 6.

The present invention contemplates a simple and inexpensive filter element for a replaceable filter unit, which element is inexpensively prepared by depositing an integral layer of fibrous material on a porous former. The filter element is of one-piece construction, capable of retaining a large volume of solid material, is not subject to fluid channeling and forms a positive seal with the filter unit which prevents passage of any solid around or through the filter unit. The filter element is of sufficient strength to resist the pressures ordinarily encountered in circulating fuel systems wherein the filter is employed.

Considering the drawings in greater detail, Figs. 1 and 2 show alternative embodiments of the filter element which is the subject of the present invention. In Figs. 1 and 2 the element is shown as comprising a body 1 having attached thereto in integral relation, a bottom portion 2 and a flange portion 3. The difference between the articles of Fig. 1 and Fig. 2 resides in the dimple, re-entrant, or concave portion 4 of Fig. 1 which increases the filtering area and the rigidity of the filter. As shown in Fig. 2 the base portion may be flat if desired. It is contemplated that the shape of the element may be varied to correspond with any particular design of filter unit so long as the article may still be molded in accordance with the process described in detail herein. Hence, the design of the base, body and flange of the filter element may be altered as desired. A conical, oval, square or rectangular element may be employed while still retaining the spirit of the invention.

Fig. 3 shows the filter element of Fig. 2 or Fig. 1 in an upright position indicating the relation of the flange portion 3 to the body portion 1.

Fig. 4 represents the preferred embodiment of the molding apparatus 5 which may be employed in the manufacture of the filter element of Figs. 2 and 3. The molding apparatus 5 consists of a hollow interior 6 which is enclosed by a solid base 7 and a perforated section 8 of relatively heavy metallic structure. The perforations 9 allow for the transmission of pressure between the screen 10 and the interior 6. Pressure within the mold may be reduced by applying suction to the entry line 11. The screen 10 fits tightly over the perforated section 8, assuming the general shape thereof. The screen 10 is secured at the edges by means of the solid flanged element 12 which fits over the screen and the edge of the base portion 7. The element 12 is adjustable to provide any desirable dimension at the area 13 which corresponds to the flange portion 3 of the article.

In operation, the molding apparatus 5 is immersed in a bath containing a slurry of fibrous material dispersed in a liquid medium such as water. Upon reduction of the pressure within the chamber 6 the external pressure on the surface of the slurry forces the dispersion of fibrous material and water onto the screen 10 forming a mat of fibres as the water passes through the screen and through the openings 9 into the reduced pressure area 6. When a layer of sufficient thickness of fibrous material has been deposited on the screen the suction is abated or the forming apparatus 5 is removed from the bath 14. In actual practice it is preferable to withdraw the former from the bath and allow air to be drawn through the mat of fibrous material until the moisture content thereof has been substantially reduced. Then the suction may be broken and the matted fibrous article may be removed by any desirable method such as by blowing through the line 11 or by the use of a transfer die, not shown, which fits over the former and withdraws the fibrous article by suction.

The fibrous article may be dried on the mold 5 if desired by forcing hot air through the line 11 from whence it will be transmitted through the screen 10 and through the matted fibers. It is likewise possible to dry the article by depositing it from the transfer die onto a heated mold where drying may be accomplished in a separate operation.

In Fig. 5 the former is viewed from the top so that only the screen 10 and the flanged element 12 may be seen. It will be observed that the screen is composed of 3 portions, namely, the top portion 15, the sloping side portion 16 and the flange portion 17. It is contemplated that the design of the former 5 may be altered in any suitable way to provide a filter element which will correspond to any desired design of filter unit.

Fig. 6 represents a preferred embodiment of a completed filter unit for use in liquid fuel systems in which the filter unit consists of a body 18 having a side portion 19, a basal flange 20, an offset support portion 21 and a removable top 22. The completed filter unit 18 has fitted therein one of the fibrous filter elements as shown in Figs. 1 and 2. The flange 3 of the element is adapted for tight engagement between the shoulder portion 21 and the top 22 of the filter unit so that no liquid may pass around the filter element. The closed end 2 of the filter element provides a depositary for solid material which would otherwise pass through the openings in either end of the filter unit.

The top 22 of the filter unit may be seen in greater detail in Fig. 7 which is a top plan view of the completed filter unit of Fig. 6. The top 22 has attached thereto a plurality of wings 23 which engage a supporting article in the liquid fuel system and thereby serve as a spider to position the filter unit in stationary position in the fuel system. The opening 24 allows the liquid fuel to pass into the filter unit where any solid material is entrapped by the fibrous filter element and the cleaned fluid passes through the opposite opening 25 in the filter unit into the fuel system. The top 22 is secured to the body of the filter unit by means of the inwardly struck protuberances 26 in the shoulder portion 21 of the filter unit which fit into corresponding indentations 27 in the top 22.

While the filter element is described herein as being accreted from a fibrous dispersion onto a porous former it should be understood that this represents only the preferred method of preparing the article. It is contemplated that any method of preparation may be employed which will result in a porous article of molded fibrous materials which is capable of retaining solids and allowing the passage therethrough of non-viscous liquids. Accreting from a fibrous dispersion is preferred because of the economy, simplicity, and adaptability of the method and product.

A large variety of animal, vegetable and mineral fibrous materials are known and are available for use in the preparation of the fibrous filter element which is the subject of the present invention. Among the least expensive and best known are wood fiber, cotton linters, wool fiber and grass fibers. In addition to these, any other type of cellulosic fiber may be used and other types of fiber, such as glass or plastic fiber may be employed. The invention is not limited to any particular type of fibrous material but contemplates the use of any material or combination of materials which may be available to the operator.

The strength of the filter article should be sufficient to resist the action of the circulatory pressure in the liquid fuel system. The strength of the filter element may be regulated by the thickness of the fibrous deposit, or if desired, resin addition agents may be added to enhance the strength of the article. A large number of resins are known and are available for addition to the fibrous dispersion for enhancing the strength of an accreted article. For example, the melamine wet strength resins and the phenol-aldehyde resins have proven satisfactory as strength enhancing agents for addition to fibrous materials.

It will be seen from the foregoing that the present invention provides an inexpensive and effective filter unit for use in liquid fuel systems. The molded fibrous element which is used in the filter unit is a one-piece article having a long life and is capable of retaining a large volume of solid material. Additionally, it is not subject to the channeling and by-passing which have heretofore limited the use of other types of filter units. Furthermore, it is adapted to remove very fine particles of carbon and other solids from gasoline or other non-viscous liquids.

The shape of the filtering area may be varied without departing from the invention. Thus, the sides may have steps or flutes to increase the surface area.

The invention is hereby claimed as follows:

A replaceable filter unit for liquid fuel systems comprising a casing of generally cylindrical shape having a base portion at one end thereof provided with an opening, a shoulder portion at the opposite end and a side wall portion connecting said shoulder and base portions, a top for said casing having an opening therein and provided with a plurality of members extending beyond the sides of the casing and adapted to position the filter unit in a fuel system, a filter element of porous integrally accreted molded fibrous material adapted to fit inside said casing in spaced relation to the walls thereof to prevent the passage of solid materials between the openings in said top and said base, said filter element being formed as a hollow member with an opening at one end and the other end closed and a flange around the open end adapted to seat on the shoulder portion of said casing, and means adapted to hold said top in place with the flange of said filter element clamped between said top and the shoulder of said casing.

RUSSELL H. CURTIS.

References Cited in the file of this patent

UNITED STATES PATENTS

| Number | Name | Date |
| --- | --- | --- |
| 638,698 | Bourie | Dec. 12, 1899 |
| 966,181 | Durbrow | Aug. 2, 1910 |
| 1,655,474 | Mueller | Jan. 10, 1928 |
| 1,676,024 | Hansen | July 3, 1928 |
| 1,764,660 | Sweetland | June 17, 1930 |
| 1,949,803 | Loebs | Mar. 6, 1934 |
| 2,042,106 | Knight | May 26, 1936 |
| 2,079,667 | Swift | May 11, 1937 |
| 2,146,749 | Knight | Feb. 14, 1939 |
| 2,147,792 | Knight | Feb. 21, 1939 |
| 2,385,145 | MacDonald | Sept. 18, 1945 |
| 2,395,301 | Sloan | Feb. 19, 1946 |
| 2,485,547 | Blau | Oct. 25, 1949 |
| 2,521,107 | Wiley | Sept. 5, 1950 |

FOREIGN PATENTS

| Number | Country | Date |
| --- | --- | --- |
| 8,562 | Australia | Aug. 10, 1933 |